United States Patent
Yoshida et al.

(10) Patent No.: US 8,951,039 B2
(45) Date of Patent: Feb. 10, 2015

(54) COMBUSTOR EQUIPPED WITH AIR FLOW RATE DISTRIBUTION CONTROL MECHANISM USING FLUIDIC ELEMENT

(75) Inventors: Seiji Yoshida, Tokyo (JP); Yoji Kurosawa, Tokyo (JP); Takeshi Yamamoto, Tokyo (JP); Kazuo Shimodaira, Tokyo (JP)

(73) Assignee: Japan Aerospace Exploration Agency, Tokyo (JP)

( * ) Notice: Subject to any disclaimer, the term of this patent is extended or adjusted under 35 U.S.C. 154(b) by 965 days.

(21) Appl. No.: 12/576,455

(22) Filed: Oct. 9, 2009

(65) Prior Publication Data

US 2010/0092901 A1 Apr. 15, 2010

(30) Foreign Application Priority Data

Oct. 14, 2008 (JP) ................................ 2008-265575

(51) Int. Cl.
*F23Q 9/10* (2006.01)
*F23R 3/28* (2006.01)
(Continued)

(52) U.S. Cl.
CPC . *F23R 3/286* (2013.01); *F23R 3/10* (2013.01); *F23R 3/26* (2013.01); *F23D 2900/14482* (2013.01); *F23N 2035/06* (2013.01); *F23N 2037/02* (2013.01); *Y02T 50/675* (2013.01)
USPC ................ 431/281; 431/1; 431/12; 431/114; 137/803

(58) Field of Classification Search
CPC ....... F23Q 9/10; F23Q 9/045; F23N 2037/02; F23N 5/00; F23N 2035/00; F23N 2035/02; F23N 1/02; F23R 3/16

USPC .......... 431/281, 1, 12, 114, 280, 18; 137/803, 137/866; 239/406, 404, 405, 423; 60/39.23, 60/748

See application file for complete search history.

(56) References Cited

U.S. PATENT DOCUMENTS 3,388,862 A 6/1968 Gabrielson
RE27,142 E * 6/1971 Taplin et al. ............... 60/39.281
(Continued)

FOREIGN PATENT DOCUMENTS

GB 1 581 531 12/1980
JP 62-69020 A 3/1987
(Continued)

OTHER PUBLICATIONS

Search Report under Section 17 and Examination Opinion for the Application No. GB0917335.2 from the intellectual Property Office of the United Kingdom dated Feb. 2, 2010.

*Primary Examiner* — Avinash Savani
(74) *Attorney, Agent, or Firm* — Cheng Law Group, PLLC

(57) ABSTRACT

The object of the invention is to provide a lightweight mechanism that changes the distribution of a flow rate of air for combustion supplied into each burner, without providing a mechanical movable part in a passage for high-temperature and high-pressure air for combustion in a combustor having a plurality of burners such as a pilot burner and a main burner. The combustor equipped with an air flow rate distribution control mechanism based on a fluidic element in accordance with the present invention has a plurality of burners such as a main burner and a pilot burner, wherein with the fluidic element being disposed upstream of a passage of air for combustion that is supplied to each burner, and means for sucking out or blowing out air into a control air passage of the fluidic element being provided, the distribution of a flow rate of the air flowing into the burners is controlled by changing a flow direction of the air for combustion.

10 Claims, 6 Drawing Sheets

(51) Int. Cl.
*F23R 3/10* (2006.01)
*F23R 3/26* (2006.01)

(56) References Cited

U.S. PATENT DOCUMENTS

| | | | |
|---|---|---|---|
| 3,748,852 A | 7/1973 | Cole et al. | |
| 4,817,863 A * | 4/1989 | Bragg et al. | 236/49.4 |
| 5,094,610 A * | 3/1992 | Mandai et al. | 431/183 |
| 6,189,320 B1 * | 2/2001 | Poeschl et al. | 60/737 |
| 6,343,927 B1 * | 2/2002 | Eroglu et al. | 431/1 |
| 6,389,798 B1 | 5/2002 | Tilston et al. | |
| 6,474,569 B1 | 11/2002 | Brundish et al. | |
| 6,594,999 B2 * | 7/2003 | Mandai et al. | 60/722 |
| 6,705,855 B2 * | 3/2004 | Nagayama et al. | 431/12 |
| 6,895,758 B2 * | 5/2005 | Knight | 60/773 |
| 6,920,758 B2 * | 7/2005 | Matsuyama et al. | 60/725 |

FOREIGN PATENT DOCUMENTS

| | | |
|---|---|---|
| JP | 6-137558 A | 5/1994 |
| JP | 2000-18505 A | 1/2000 |
| JP | 2000-18565 A | 1/2000 |
| JP | 2000-39107 A | 2/2000 |
| JP | 3116081 B2 | 10/2000 |
| JP | 2000-346345 A | 12/2000 |
| JP | 2003-56365 A | 2/2003 |

* cited by examiner

Fig. 7 Prior Art
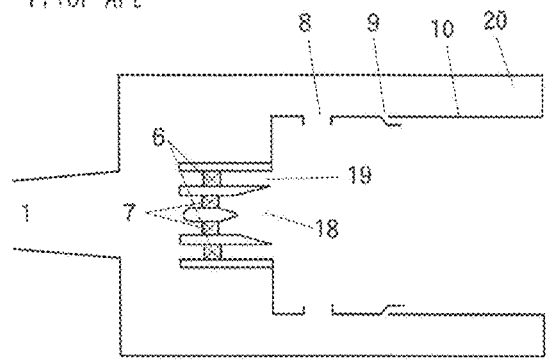
Fig. 8 Prior Art    EXPLANATORY DRAWING ILLUSTRATION OPERATION OF FLUIDIC ELEMENT
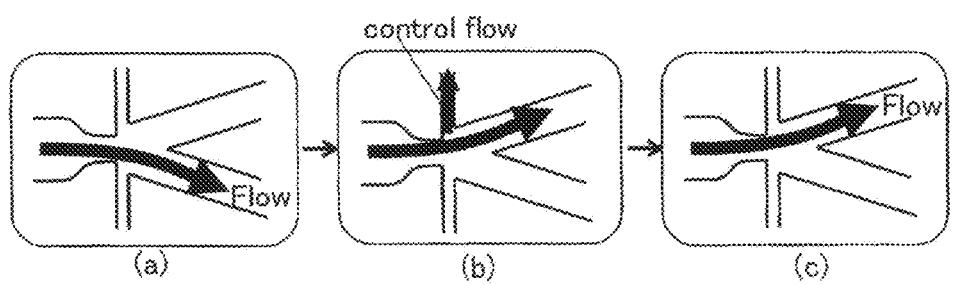
Fig. 9    AVERAGE FLOW VELOCITY DISTRIBUTION DIAGRAM
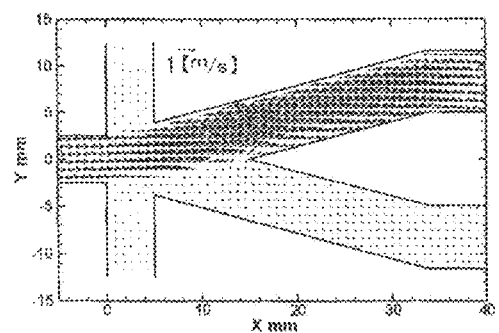
(a) Sharp edge splitter
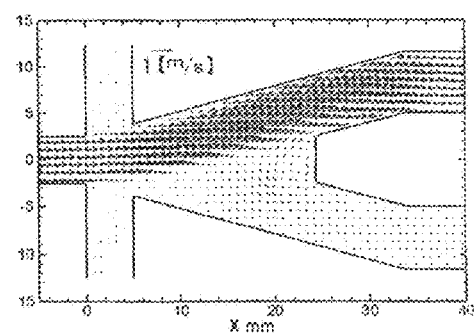
(b) Flat edge splitter Fig. 10
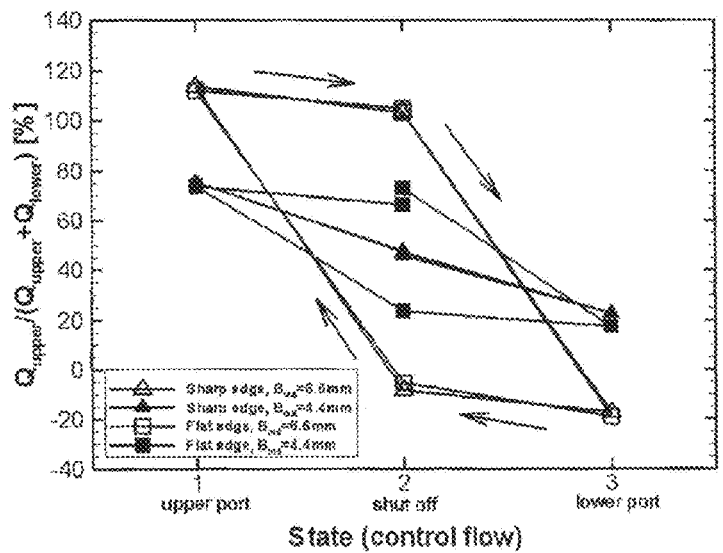
A FLOW RATE RATIO AT OUTLET CALCULATED FROM PID MEASUREMENT RESULTS
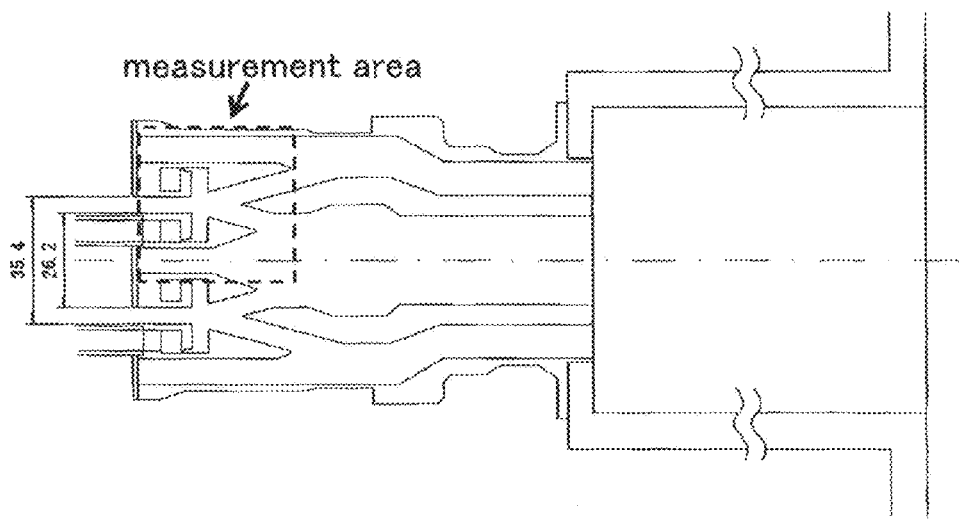
B TEST MODEL Fig. 11
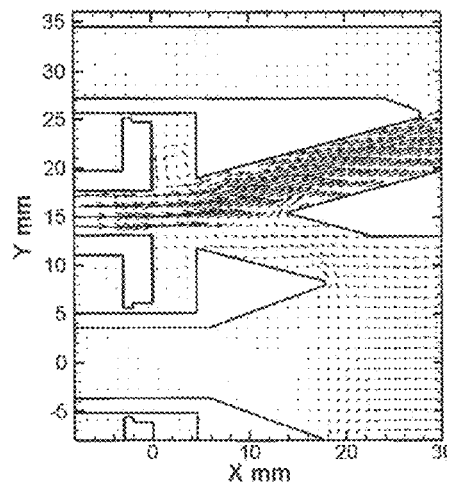
(a) Fluidic_3Dwater_070420_13
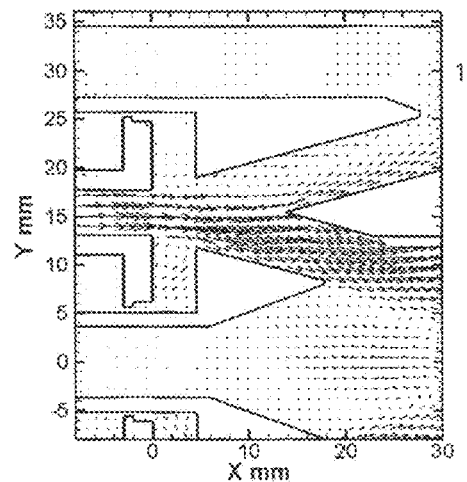
(b) Fluidic_3Dwater_070420_11
AVERAGE FLOW VEROCITY DISTRIBUTION IN MEASUREMENT AREA SHOWN IN FIG 10B
Fig. 12
A RATIO OF FLOW RATE AT MAIN-SIDE OUTLET TO TOTAL FLOW LATE
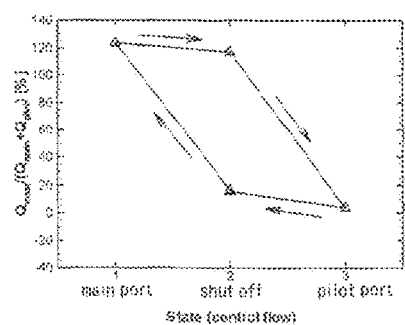
B TEST MODEL
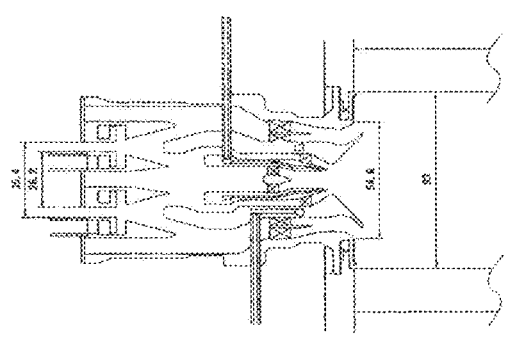

Fig. 13    DIRECT PHOTOS OF FLAME
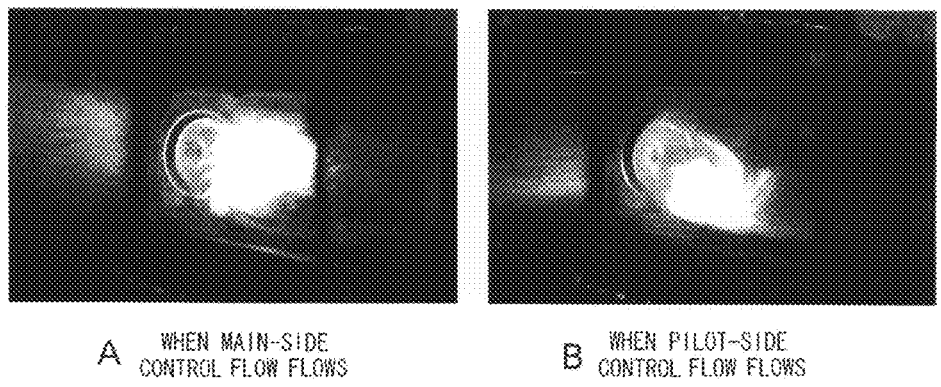
A  WHEN MAIN-SIDE CONTROL FLOW FLOWS
B  WHEN PILOT-SIDE CONTROL FLOW FLOWS
Fig. 14    AVERAGE FLOW VELOCITY DISTRIBUTION DIAGRAM
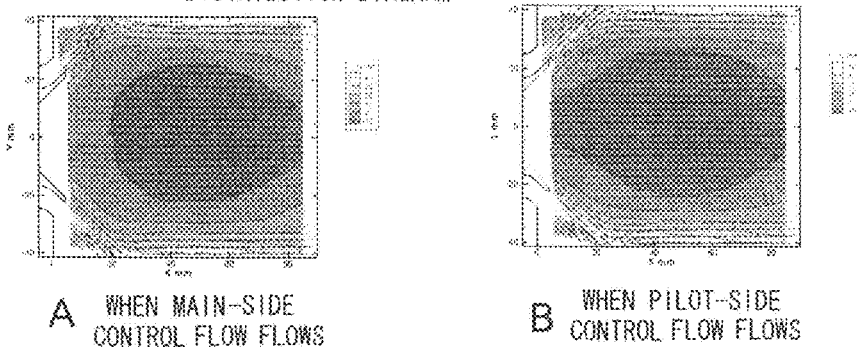
A  WHEN MAIN-SIDE CONTROL FLOW FLOWS
B  WHEN PILOT-SIDE CONTROL FLOW FLOWS
Fig. 15
A  AXIAL FLOW VELOCITY DISTRIBUTION AT X = 7.2mm
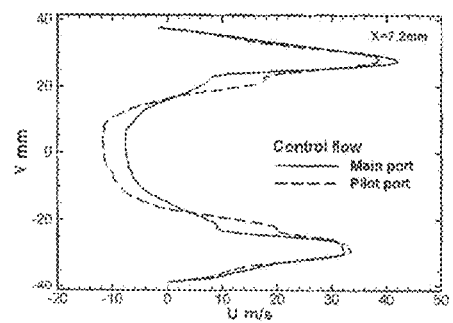
B  CONTROL FLOW NECESSARY FOR SWITCHING FROM MAIN SIDE TO PILOT SIDE
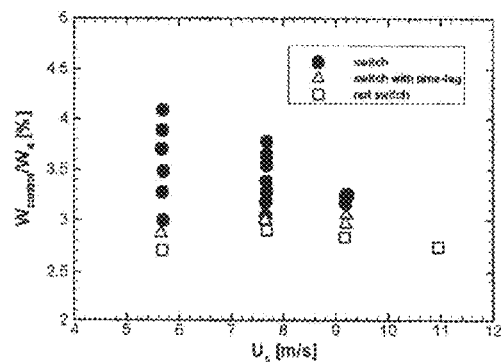

COMBUSTOR EQUIPPED WITH AIR FLOW RATE DISTRIBUTION CONTROL MECHANISM USING FLUIDIC ELEMENT

BACKGROUND OF THE INVENTION

1. Field of the Invention

The present invention relates to a combustor for an industrial gas turbine or an aircraft jet engine that is equipped with an air flow rate distribution control mechanism.

2. Description of the Related Art

Industrial gas turbines, aircraft jet engines, and incinerators discharge a small amount of toxic emissions into the surrounding atmosphere. The toxic emissions include carbon monoxide and unburned hydrocarbons, but the main problem is associated with the emission of oxides of nitrogen (NOx).

The amount of generated oxides of nitrogen shows strong dependence on temperature, and the concentration of oxides of nitrogen in the emissions can be reduced by lowering the combustion temperature in the combustion. Further, by using a premixing combustion system in which a mixed gas is combusted that is obtained by mixing a fuel and an oxidizer in advance, it is possible to suppress the formation of local high-temperature regions and control the combustion temperature. Further, by using a fuel-lean premixing combustion in which a fuel is combusted with excess air, it is possible to lower the average combustion temperature.

However, in a combustor using lean premixing combustion, when a mixing ratio of a fuel and an oxidizer is changed, pressure fluctuations can occur that can lead to the destruction of the combustor, or a sufficient combustion reaction does not proceed and unburned fuel is discharged from the combustor. The increase in the emission of unburned components degrades fuel efficiency and is also impermissible from the standpoint of preventing environmental pollution. Thus, the problem associated with lean premixing combustion is that such combustion can be effectively used only in a narrow mixing ratio range.

In an industrial gas turbine or aircraft jet engine, the flow rate of air and flow rate of fuel that flow into a combustor are determined according to the operation state, and in a combustor using lean premixing combustion, a plurality of fuel injection valves are disposed in the combustor and the flow rate of fuel injected from the fuel injection valves is regulated so as to maintain the mixing ratio of fuel and air of the combustion region in an adequate range.

In order to maintain the mixing ratio of fuel and air of the combustion region in an adequate range and sustain stable flame, a combustor is used that has a pilot combustion unit using premixing combustion or diffusion combustion with a comparatively high concentration of fuel for forming stable flame and a main combustion unit with a comparatively low fuel concentration for conducting low-NOx combustion. A combustor, in which a pilot combustion unit 18 is located in a center and a main combustion unit 19 is disposed around the pilot combustion unit, as shown in FIG. 7, is known as one embodiment of combustors having a pilot combustion unit and a main combustion unit. In such a combustor, stable flame is formed in the pilot combustion unit located in the center, and a mixed gas of the main combustion unit, which can easily become unstable, can be combusted with comparatively high stability. However, in the operation conditions of industrial gas turbines and aircraft jet engines, the air flow rate or fuel flow rate vary within a wide range. Therefore, the flow rate control of air flowing into the combustion region is sometimes conducted to maintain the fuel concentration in the combustion region within an adequate range and perform more stable combustion in the combustor.

Examples of mechanisms that control the flow rate distribution of air flowing into the combustion include a mechanism that controls the flow rate distribution of air flowing into the combustion region and dilution region, as disclosed in Patent Document 1 (Japanese Patent Number 3116081 "AIR DISTRIBUTION CONTROL GAS TURBINE COMBUSTOR"), and a mechanism that controls the flow rate distribution of air flowing into the pilot combustion unit and main combustion unit, as disclosed in Patent Document 2 (Japanese Patent Publication Number 06-137558 "FLOW RATE DISTRIBUTION CONTROL MECHANISM FOR GAS TURBINE BURNING APPARATUS"). With both mechanisms, the air flow rate is changed by changing an air passage area with a mechanically operated part. This movable part is provided in a passage of high-temperature high-pressure air discharged from the compressor, and a problem associated therewith is that the mechanism of the movable part is complex due to measures taken to prevent the effect of thermal expansion. Further, in aircraft jet engines, weight and size reduction are especially important, and because the addition of a complex mechanism increases weight, it is necessary to realize the air flow rate distribution control with as simple a mechanism as possible.

SUMMARY OF THE INVENTION

It is an object of the present invention to provide a lightweight mechanism that changes the distribution of flow rate of air for combustion supplied into each burner, without providing a mechanical movable part in a passage for high-temperature and high-pressure air for combustion in a combustor having a plurality of burners.

As shown in FIG. 1, upstream of an air passage of a pilot burner 18 and a main burner 19 that conduct air fuel rate distribution control, the passage branches in a Y-like configuration, and a fluidic element 4 of a cross-sectional shape provided with a passage of control air is provided in the branch location. The combustor shown in the figure is of a configuration in which the central pilot burner 18 is surrounded by the annular main burner 19, and the fluidic element is also formed in an annular shape. The cross section of the fluidic element 4 has a basic structure such as shown in FIG. 2. The air flowing in from a combustion air inlet 2 is subjected to an action of a small amount of control air that flows out from or flows in control air passages 3a and 3b and, accordingly, selectively flows out from an outlet 5a or an outlet 5b linked to the pilot burner 18 or main burner 19, respectively. Thus, where the control air is caused to flow in from the control air passage 3a as shown by arrow 20a, or where the control air is caused to flow out from the control air passage 3b as shown by arrow 21b, the flow of air flowing in from the combustion air inlet 2 is bent in the direction of outlet 5b and the flow rate of air for combustion flowing out of the outlet 5b increases. Conversely, where the control air is caused to flow out from the control air passage 3a as shown by arrow 20b, or where the control air is caused to flow in from the control air passage 3b as shown by arrow 21a, the flow of air flowing in from the combustion air inlet 2 is bent in the direction of outlet 5a and the flow rate of air for combustion flowing out of the outlet 5a increases. By such an operation of the fluidic element 4, it is possible to change the distribution of flow rate of air supplied to the pilot burner 18 and main burner 19.

The relationship characteristic of the flow rate of control air and flow rate distribution of air for combustion can be variously changed by changing the passage shape and can be imparted with a hysteresis (history phenomenon) characteristic.

The combustor equipped with an air flow rate distribution control mechanism based on a fluidic element in accordance with the present invention has a plurality of burners such as a main burner and a pilot burner, wherein with the fluidic element being disposed upstream of a passage of air for combustion that is supplied to each burner, and means for sucking out or blowing out air into a control air passage of the fluidic element being provided, the distribution of a flow rate of the air flowing into the burners is controlled by changing the flow direction of the air for combustion.

In the combustor according to one embodiment of the present invention, the plurality of burners are configured so that a central pilot burner is surrounded by an annular main burner, and the fluidic element is of an annular configuration with an Y-shaped cross section.

Further, in the combustor according to one embodiment of the present invention, the means for sucking out or blowing out air into the control air passage is switchably provided with a function of sucking air from one of two control ports and a function of blowing air into the other of the control ports.

Further, in the combustor according to one embodiment of the present invention, the means for sucking out or blowing out air into the control air passage is provided only with a function of sucking air into a control port.

Further, in the combustor according to one embodiment of the present invention, a passage, in which air supplied to the burners does not pass through the fluidic element, is provided in addition to the passage, in which the air passes through the fluidic element.

The present invention also provides a jet engine in which multiple combustors equipped with an air flow rate distribution control mechanism described hereinabove are disposed annularly in positions inside a liner.

Because the combustor equipped with an air flow rate distribution control mechanism based on a fluidic element in accordance with the present invention uses the above-described configuration, the air flow rate distribution can be varied with a simple structure, without providing a mechanical movable part in a high-temperature high-pressure location. Further, because the structure is simple, probability of failures is decreased and reliability is increased. Moreover, because the structure is simple, weight and size can be reduced which is especially important for aircraft jet engines.

With the configuration in which the means for sucking out or blowing out air into the control air passage is switchably provided with a function of sucking air from one of two control ports and a function of blowing air into the other of the control ports, the flow rate ratio control can be performed with higher accuracy and better stability than in a configuration in which only one-way control is performed.

With the configuration in which the means for sucking out or blowing out air into the control air passage is provided only with a function of sucking air into a control port, it is not necessary to use an air source with a pressure higher than that in the location where the control air is blown out in the fluidic element and a control pressure source can be easily realized.

With the combustor configured so that a passage in which air supplied to the burners does not pass through the fluidic element is provided in addition to the passage in which the air passes through the fluidic element, a predetermined amount from among the air passing through a swirler can be ensured at all times and the flow rate of the remaining air is regulated. Therefore, the variation amount of the fuel rate ratio can be reduced and the amount of air passing through each swirler can be prevented from being too low.

BRIEF DESCRIPTION OF THE DRAWINGS

FIG. 7 illustrates a structure of the conventional combustor provided with a pilot burner and a main burner;

FIG. 8 illustrates the operation of a fluidic element;

FIG. 9 illustrates the average flow velocity distribution in a two-dimensional model test;

FIG. 10A shows a flow rate ratio of an output side to a total flow rate in the two-dimensional model test, FIG. 10B shows a three-dimensional model used in the test;

FIG. 11 illustrates the average flow velocity distribution in a three-dimensional model test;

FIG. 12A shows a flow rate ratio of an output side to a total flow rate in the three-dimensional model test, FIG. 12B is a cross-sectional view of a combustion test model;

FIG. 13 is a photograph of flame in the combustion test;

FIG. 14 shows a flow velocity distribution in a cross section passing through a nozzle central axis in a non-combusted state; and FIG. 15A shows an axial flow velocity distribution at X=7.2 mm, and FIG. 15B shows the necessary amount of control flow when switching is performed from the main side to the pilot side.

DESCRIPTION OF THE PREFERRED EMBODIMENTS

Figure 1:
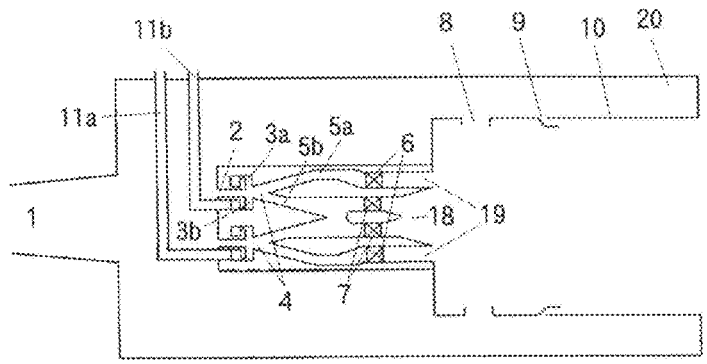
FIG. 1 illustrates a basic structure of the combustor equipped with an air flow rate distribution control mechanism based on a fluidic element in accordance with the present invention.
Figure 2:
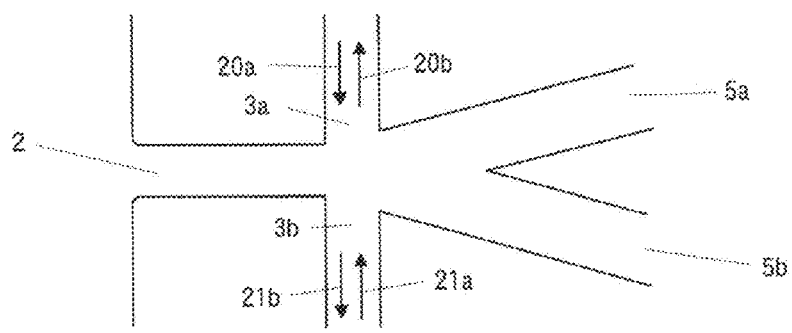
FIG. 2 shows a Y-shaped fluidic element used in accordance with the present invention.

The present invention provides a combustor having a plurality of burners such as a main burner and a pilot burner, wherein a fluidic element is disposed upstream of a passage of air for combustion that is supplied to each burner and means is provided for sucking out or blowing out air into a control air passage of the fluidic element. A feature of disposing a fluidic element in an upstream air passage through which air for combustion is supplied to the burner is disclosed in Patent Documents 3 to 6. The object of the "Heat Accumulation Burner Device" disclosed in Patent Document 3(Japanese Patent Publication Number 2000-346345 "BURNER DEVICE AND GAS-TURBINE ENGINE PROVIDED WITH THIS") is to reduce power required to open and close a valve and also to prevent malfunction of the valve caused by wear. This document suggests disposing one three-way switching valve in a branching point of a pair of pipes that supply air for combustion to each of a pair of burners disposed in a combustion chamber and discloses a configuration in which a fluidic element is used as an embodiment of the three-way switching valve. Because this three-way switching valve functions to switch the air flow that flows to a pair of burners, the fluidic element used herein has a switching function. A configuration in which a fluidic element is disposed upstream of a plurality of burners is similar to that of the present invention, but the technical concept of the object and effect thereof are different from that of the present invention according to which the air flow rate ratio to each burner is adjusted.

The object of Patent Document 4(Japanese Patent Publication Number 2003-56365) titled "REGENERATIVE BURNER DEVICE" is to provide a burner device in which a plurality of combustion chambers are provided to supply a mixed gas to and cause combustion thereof in a combustion unit, a respective supply unit that supplies a fuel is provided in each combustion passage, part of the fuel supplied from the supply unit is received in one combustion passage, a supply part that conducts supply to the supply unit of the combustion passage of the next stage is provided between the combustion passages, the distribution ratio of fuel to the supply path side in the supply unit of one combustion passage and the supply path increases with the increase in the total supply flow rate of the fuel and, conversely, the distribution ratio of fuel to the supply path side decreases with the decrease in the total supply flow rate, this burner device being capable of maintaining the preferred combustion state at all times. In this burner device a fuel temperature control means is provided for controlling the temperature of fuel supplied to a fuel element structure so that the distribution ratio determined by the total supply flow rate in the fluidic element structure is confined within a constant range with respect to a predetermined set distribution ratio. The technical concept of this burner device is also different from that of the present invention according to which the air flow rate ratio to a plurality of burners is adjusted.

The object of the "FORCEDLY OSCILLATED COMBUSTOR" described in Patent Document 5(Japanese Patent Publication Number 2000-39107) is to increase durability and cost performance of a forced vibration combustor, wherein a fluidic element in which oscillations are generated as the fluid flows in from a supply port and pulsations are produced in the flow rate of the fluid flowing out from the outlet port. In this combustor, the fluidic element is introduced in a fuel supply path, or supply path of an oxygen-containing gas for combustion, or a mixing gas supply path to the combustor. The technical concept of this burner device is also different from that of the present invention according to which the air flow rate ratio to a plurality of burners is adjusted.

The object of the invention relating to "GAS BURNER" and disclosed in Patent Document 6(Japanese Patent Publication Number 2000-18565) is to provide a gas swirler that can reduce the amount of oxides of nitrogen in the combustion waste gas even without a mechanical drive unit. This gas burner uses fluidic elements 2A, 2B, and 2C that switch gas passages so that when gas supplied from the outside is ejected from one gas ejection port via one gas passage, part of the gas flowing in the one gas passage is caused to flow in a feedback mode to another gas passage, whereby the gas supplied from the outside is caused to be ejected from another gas ejection port via the another gas passage.

Thus, a feature of disposing a fluidic element in a position upstream of a burner has already been suggested, but the object and effect attained in all such configuration are different from those of the present invention.

The simplest shape relating to an embodiment of the present invention is shown in FIG. 1. The air flowing in from the combustor inlet 1 reaches a main burner 19 and a pilot burner 18 via a route including a fluidic element 4, a swirler 6, and a swirler 7. In a separate route, the air flows via a dilution port 8 and a cooling port 9 into the combustion region surrounded by a liner 10.

In the fluidic element 4, the air for combustion that flows in from the fluidic element inlet 2, which is a cylindrical passage, branches in the intermediate location and flows out from a fluidic element outlet 5a, which is a cylindrical passage, and a fluidic element outlet 5b, which is a cylindrical passage disposed inside the aforementioned fluidic element outlet. The fluidic element outlet 5a and fluidic element outlet 5b are connected to the swirler 6 and swirler 7, respectively, and the air flowing out from the fluidic element outlet flows into the liner 10 via the respective swirler 6 or 7. Control air passages 3a and 3b serving to cause the air located inside the fluidic element 4 to flow to the outside of the combustor casing 20 via control air pipes 11a and 11b, or to cause the air to flow from the outside of the combustor casing 20 into the fluidic element are connected to the location where the passage of the fluidic element 4 branches. By varying the flow rate of control air that flows in/out from the control air passages 3a and 3b, it is possible to vary the flow rate distribution of air flowing out from the fluidic element outlets 5a and 5b and vary the flow rate distribution of air flowing from the swirlers 6 and 7 into the liner 10.

The object of the present invention is to vary the air flow rate ratio of routes from the combustor inlet to the liner, and whether a swirler or the like is provided between the fluidic element outlet and the liner is not a substantial issue in accordance with the present invention.

FIG. 1 shows a cylindrical combustor, but the present invention is not limited to the combustor of such a shape. For example, the present invention can be also used to vary the air flow rate distribution in a combustor in which a plurality of burners are disposed in a transverse direction.

In accordance with the present invention, an embodiment is suggested in which only a means for sucking out the air is provided in the control port of the fluidic element. The distribution of air flow rate is typically controlled by blowing out the air from the control port. However, in order to perform control by blowing out, it is necessary to provide an air source with a pressure higher than that in a location where the control air inside the fluidic element is blown out. In an aircraft jet engine or industrial gas turbine, a combustor is a location with the highest pressure. Therefore, in order to perform control by blowing out, an air source with even higher pressure has to be separately prepared. By contrast, in order to conduct control by sucking out, as in the present embodiment, it is suffice to make connection to a zone with a lower pressure, which can be easily realized. The control of fluidic element by sucking out the air can be said to be especially effective when the fluidic element is disposed in a high-pressure field.

Figure 3:
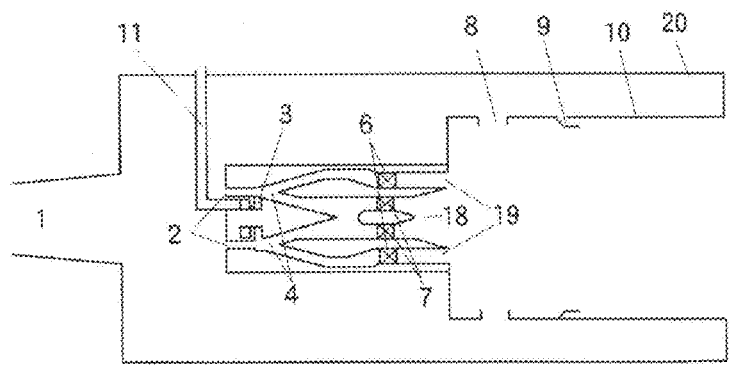
FIG. 3 shows a modified structure of the combustor equipped with an air flow rate distribution control mechanism based on a fluidic element in accordance with the present invention.

In the present embodiment two control air pipes 11a and 11b are provided, but the present invention can be also implemented with a configuration in which a control passage is provided only on one side, as shown in FIG. 3. In this case, either of the control air passage 3 and control air pipe 11 leading from the fluidic element to the outside of the combustor casing can be omitted and a simpler configuration can be obtained. Performing pressure control of two control ports, as in the example illustrated by FIG. 1, is advantageous for performing flow rate ratio control with better accuracy and stability.

In a case of two control ports, where the ports are denoted by (a) and (b), the following three control air states are assumed when the control is performed by blowing air out.

TABLE 1

| State | Port (a) | Port (b) |
|-------|----------|----------|
| a1 | Blow out | Stop |
| a2 | Stop | Blow out |
| a3 | Stop | Stop |

Further, the following three states are assumed when the control is performed by sucking air out.

TABLE 2

| State | Port (a) | Port (b) |
|-------|----------|----------|
| b1 | Suction out | Stop |
| b2 | Stop | Suction out |
| b3 | Stop | Stop |

In other words, where two control ports are present, the control of flow element can be performed by only either one of blow out and suction out. By contrast, where one control is provided, the following three states of control air are assumed.

TABLE 3

| State | Port |
|-------|------|
| b1 | Blow out |
| b2 | Suction out |
| b3 | Stop |

As described hereinabove, in a case of one control port, there is a merit of reduced number of control ports, but also a demerit of necessarily conducting both the suction out and the blow out operations. In a case of two control ports, when both the suction out and the blow out operations are used, the control cannot be conducted where one port is imparted only with a suction out function and the other port is imparted with the flow out function. Therefore, the suction out function and blow out function has to be provided to both ports.

Figure 4:
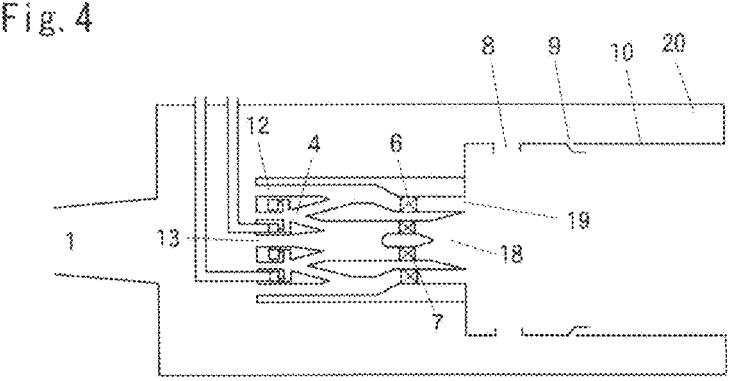
FIG. 4 illustrates an embodiment of the combustor equipped with an air flow rate distribution control mechanism based on a fluidic element in accordance with the present invention.

Another embodiment of the present invention is shown in FIG. 4. A specific feature of this embodiment is in that bypass passages 12 and 13 are provided through which the air flowing in from the combustion inlet 1 reaches the swirlers 5 and 6, without passing through the fluidic element 4. Where such bypass passages are provided, a predetermined amount of air passing through the swirlers 6 and 7 is ensured at all times and the flow rate of the remaining air is adjusted. Therefore, the variation amount of flow rate ratio can be decreased and the amount of air passing through each swirler can be prevented from becoming too low.

Figure 5:
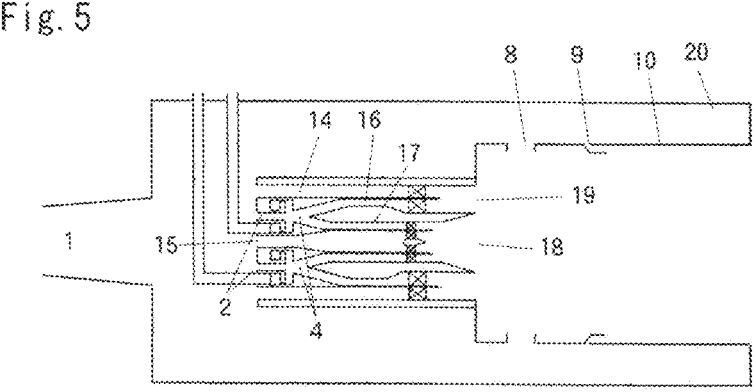
FIG. 5 illustrates another embodiment of the combustor equipped with an air flow rate distribution control mechanism based on a fluidic element in accordance with the present invention.

Yet another embodiment is shown in FIG. 5. In this embodiment, similarly to the embodiment illustrated by FIG. 4, passages that do not pass through the fluidic element 4 are provided on the inside and outside of the fluidic element 4. Thus, passages 14 and 15 that pass directly inside the liner are provided completely separately from the air of passages 16 and 17 that pass through the fluidic element 4. The difference between this embodiment and that illustrated by FIG. 4 is in that the air that passes through the passages 14 and 15 is supplied to the burner, without mixing with the air of passages 16 and 17 that pass through the fluidic element 4 as far as a position downstream of the swirlers. Where such bypass passages 14 and 15 are provided, a predetermined amount of air passing through the swirlers 6 and 7 is ensured at all times and the flow rate of the remaining air is adjusted. Therefore, the variation amount of flow rate ratio can be decreased and the amount of air passing through each swirler can be prevented from becoming too low. A specific feature of this embodiment is that the air of the passages 16 and 17 that passed through the fluidic element 4 and the air that passed through the passages 14 and 15 are not mixed before the position downstream of the swirlers. The resultant effect is that flow rate distribution control can be conducted with good stability by the fluidic element 4, without being affected by mixing.

EXAMPLE EMBODIMENTS

Figure 6:
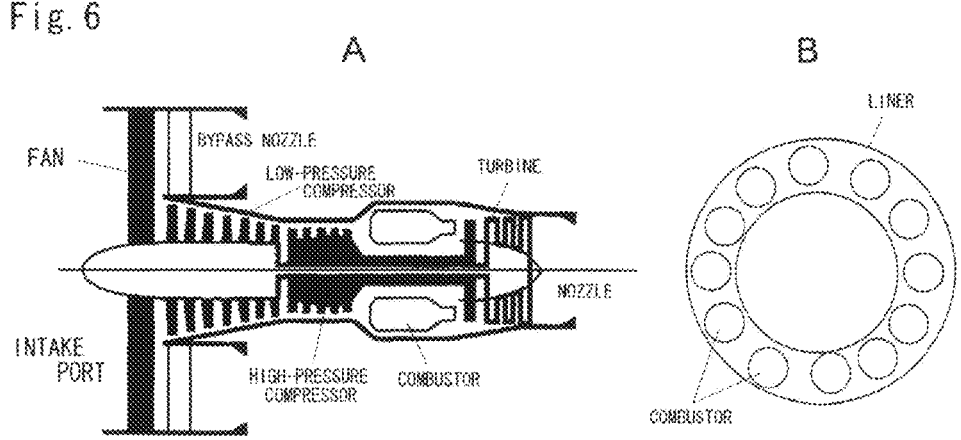
FIG. 6 illustrates an exemplary embodiment of a jet engine in which a larger number of combustors in accordance with the present invention are assembled.

An example embodiment of a jet engine of an integral structure having a plurality of combustors in accordance with the present invention disposed therein is shown FIG. 6. In an entire structure of a general jet engine shown in FIG. 6A, multiple combustors are disposed in a toric shape (donut shape) as shown in FIG. 6B, and the combustor in accordance with the present invention in which the main burner 19 annularly surrounds the pilot burner 18, such as described hereinabove, is used as each of the multiple combustors. In the present embodiment, the liner denoted by the reference numeral 10 in FIG. 1 has a toric shape, as shown in FIG. 6B, and the multiple combustors are disposed in the position thereof and share the liner.

The operation characteristic of a fuel nozzle that performs air flow control with the fluidic element constituting the basis of the present invention will be described below.

First, "a fluidic element" will be explained. A fluidic diverter that controls the direction of flow is a fluidic element that uses a Coanda effect according to which a high-speed flow attaches itself to a wall surface, and the fluid diverter can use a small amount of control fluid to switch between two directions of a larger flow. FIG. 8 illustrates the operation of the fluidic diverter. This fluidic diverter has a shape in which an inlet and two outlets of a main flow and two control ports are connected. FIG. 8A shows a state in which the flow that entered from the main flow inlet attaches itself to one of the wall surfaces. FIG. 8B shows a state in which a small amount of fluid (control fluid) is caused to flow out from or flow in the control port, whereby the main flow is attached to the opposite wall surface and the flow direction is changed. FIG. 8C shows a state in which the direction of the main flow maintains the attained state even when the control flow is stopped. FIG. 8B illustrates a mode in which the main flow direction is switched by causing the control fluid to flow out of the upper control port, but the main flow direction can be also switched by causing the control fluid to flow in from the lower control port. Typically the control of the fluidic element is carried out by causing the control fluid to flow in, and in this case it is possible to switch the main flow at a flow rate 5 to 30 times that of the control flow.

Taking into account that the fluidic element will be provided in a combustor, in order to control the main flow by causing the control fluid to flow in, it is necessary to provide an air source with a pressure higher than that of the combustor that is the component with the highest pressure in the engine, which is impractical. By contrast, in order to conduct control by causing the control fluid to flow out, it is suffice to make connection to a zone with a lower pressure, which can be easily realized. In accordance with the present invention, the control of fluidic element is in all cases conducted by causing the control fluid to flow out.

In order to determine the shape of the fluidic element a water flow test was conducted with respect to a fluidic element of a two-dimensional shape and a fluidic element of a three-dimensional shape and PIV measurements were conducted. In order to cancel the effects of light refraction and reflection and obtain a good particle image, an acrylic resin was used as a model material, an aqueous solution of sodium iodide was used as the fluid, and the test was conducted using a refractive index matching method.

First, a two-dimensional model test was conducted. The fluidic element model of a two-dimensional shape had a width of an inlet passage of 10 mm, a length in the depth direction of 100 mm, and the same passage shape in the depth diction. PIV measurements were conducted in the central cross section in the depth direction. The volume flow rate Qa of the main fluid was $6.7 \times 10^{-4}$ m$^3$/s. FIG. 9 shows an average flow velocity distribution calculated from 100 measurement results. The difference between FIGS. 9A and 9B is in the shape of a splitter that partitions the outlet into lower and upper passages. The test was conducted with respect to the shape with a sharp edge, as shown in FIG. 9A, which is the standard shape and the flat shape, as shown in FIG. 9B, obtained by cutting out the edge, thereby making it possible to expect more stable operation. Both figures illustrate the state in which the control flow was stopped after the control fluid had been caused to flow out from the upper control port. It is clear that with both shapes the flow that entered from the inlet flows along the upper wall surface and flows out from the upper outlet even after the control flow has been stopped.

The PIV measurement results were used to calculate the flow rate of fluid flowing out of each outlet and the flow rate ratio of the upper outlet to a total flow rate from the upper and lower outlets was found. The results are shown in FIG. 10A. In state 1 indicated on the abscissa in the figure, the control flow flows from the upper control port. In state 3, the control flow flows from the lower control port. In state 2, no fluid flows out of the control ports. Measurement results obtained in a case where part of a 6.6 mm width of the outlet passage of the fluidic element was closed and the outlet width was 4.4 mm are also shown in the figure. Part of the outlet was closed to generate pressure loss downstream of the fluidic element, that is, under an assumption that a fuel burner is present in the configuration in accordance with the present invention.

In a case where the outlet is not closed, substantially identical flow rate distribution characteristic is obtained, regardless of the splitter shape. Thus, when a transition is made from state 1 to state 2, the flow rate ratio practically does not change and the direction of the main flow does not change. When a transition is then made to state 3, the direction of the main flow changes and the flow rate ratio changes significantly. Further, when a transition is then made to state 2, the flow rate ratio practically does not change and the direction of the main flow maintains the previous state. In other words, the flow rate variation amount of each outlet is about 130%, and the fluidic element has a hysteresis characteristic. Where the flow rate distribution exceeds 100% or becomes below 0%, it means a reverse flow from an outlet that is opposite that of the outlet through which the main flow flows out.

Where part of the outlet of the fluidic element is closed, the difference between the flow rate distributions in state 1 and state 3 decreases to about 50%, and practically no difference is caused by the splitter shape. However, a certain difference is observed in state 2. Thus, with a flat splitter, the state attained before the control flow is stopped is maintained, whereas with the sharp splitter, the main flow flows without attaching to either of the upper and lower walls (the flow rate distribution is 50%) and the fluidic element has no hysteresis characteristic. In other words, it is clear that with a flat splitter edge, the hysteresis characteristic is easily maintained even when the resistance of a passage downstream of the outlet is high.

A test was then conducted with a three-dimensional model. In order to control the flow rate distribution of a pilot burner and a main burner that are disposed coaxially, a fluidic element model was produced that had annular inlet and outlet, and PIV measurements were conducted by a water flow test. As shown in FIG. 10B, in the test model, a duct simulating a fuel nozzle was attached downstream of the toric fluidic element. The inner diameter of the inlet passage of the fluidic element was 26.2 mm and the outer diameter thereof was 35.4 mm. Passages that were directly connected to the pilot nozzle and main nozzle, without passing through the fluidic element, were also provided, but during the test the inlet ports of these passages were closed. The flow velocity distribution in the portion surrounded by a frame in the figure was measured by PIV. The volume flow rate Qa of the main flow was $5.8 \times 10^{-4}$ m$^3$/s. FIG. 11 shows an average flow velocity distribution calculated from 100 measurement results. The passage on the upper right side of the figure communicates with the main nozzle, and the passage on the lower right side communicates with the pilot nozzle. FIG. 11A shows the measurement results obtained by causing the control fluid to flow out from the main control port and then stopping the control flow. FIG. 11B shows the measurement results obtained by causing the control fluid to flow cut from the pilot control port and then stopping the control flow. In both cases, the flow that entered from the inlet port flowed along the wall surface on the main side or pilot side, flow rate distribution control could be performed with a toric fluidic element, and the fluidic element had a hysteresis characteristic.

Similarly to the case of PIV measurements conducted with a two-dimensional shape, the ratio of flow rate in the outlet on the main side to the total flow rate was calculated from the PIV measurement results obtained with the three-dimensional shape. The results obtained are shown in FIG. 12A. The flow rate ratio of the outlet on the main side is about 120% in a case of control flow on the main side, about 115% when this control flow is stopped, 0% in a case of control flow on the pilot side, and 12% when this control flow is stopped. One of the outlets of the fluidic element is a passage that faces the center of the tube, whereas the other outlet faces the outer circumference of the tube. Thus, the shape is asymmetrical and the flow rate distribution characteristic is therefore also asymmetrical.

Although the flow rate distribution characteristic was not the object, by contrast with the case of the fluidic element of a two-dimensional shape, the flow rate variation amount was as high as 120%, similarly to the case of a two-dimensional shape, and the fluidic element was confirmed to have a hysteresis characteristic.

An "air pressure combustion test" will be explained below. The toric fluidic element was attached upstream of a fuel nozzle in which a pilot nozzle and a main nozzle were disposed coaxially, and an air pressure combustion test was conducted. The shape of a lean premixing fuel nozzle for TechClean conducted by JAXA (Japan Aerospace Exploration Agency), which is the applicant of the present application, was used without any changes as the fuel nozzle portion. FIG. 12B is a cross-sectional view of a combustion test model. The air supplied from a blower and heated with an electric heater passes through a fluidic element and a fuel nozzle and flows into a combustion chamber. The fuel nozzle is constituted by four swirlers. Two swirlers on the inner side are pilot nozzles and two on the outer side are main nozzles. A fuel for pilot nozzles is injected as a film between two swirler passages, and a fuel for main nozzles is injected from the inner wall surface of the main nozzle passage. In the present test, only the pilot fuel was used. In the fuel test model, in addition to the passage passing through the fluidic element, passages that passed to the pilot nozzle and main nozzle, without passing through the fluidic element, were also provided, but in the present test the inlet ports of both these passages were closed. The combustion chamber had the following inner dimensions: 83 mm×83 mm×274 mm. Three surfaces of the combustion chamber were made from quartz glass and one from stainless steel. The output was opened to the atmosphere.

Because a swirler is present downstream of the fluidic element, by contrast with the toric model used in the water flow test, the resistance in the passage will increase and the fluidic element will probably have no hysteresis characteristic. Taking this into account, a splitter with a flat edge shape was used in the combustion test. As a result, in the combustion test, the fluidic element was also confirmed to have a hysteresis characteristic. However, when the control flow was stopped, the flow state was sometimes changed. This was apparently due to the effect produced by turbulence from upstream or downstream of the nozzle. In order to prevent such unintended state variations, the combustion test was conducted by causing the flow of control fluid from either of the pilot side and main side at all times.

FIG. 13 shows a direct photo of flame in the combustion test. FIG. 13A shows a photo obtained when the main control flow was caused to flow, and FIG. 13B shows a photo obtained when the pilot control flow was caused to flow. The cross-sectional average flow velocity Uc in the main chamber found by dividing the volume flow rate of air in the nozzle inlet port by the cross section area of the combustion chamber is 9.2 m/s, the air temperature Tia in the nozzle inlet port is 460 K, and total air-fuel ratio A/F is 58. When the control flow is at the main side, practically the entire flame is bright flame, a drop-like substance that flowed downstream, while burning, can be observed, and atomization of the fuel does not proceed. By contrast, where the control flow is at the pilot side, bright flame is locally formed, but the major portion of the flame is of blue color and a region with a high concentration of fuel is present due to unevenness in fuel mist distribution or the like. However, atomization and mixing of the fuel can be considered to proceed effectively.

As for no-combustion flow velocity distribution measurements, the flow velocity distribution in the cross section passing through a central axis of the nozzle was measured by PIV in a no-combustion state. In order to prevent the evaporation of oil mist used as tracer particles, the air temperature was decreased with respect to that during the combustion test and Tia was 370 K. Uc was 9.3 m/s. The average flow velocity distribution found from the results obtained in 300 measurement cycles is shown in FIG. 14. The nozzle outlet center is taken as an origin point, the axial downstream direction is taken as the X axis and the up-down direction perpendicular thereto is taken as the Y axis. The direction and size of arrows represent the flow velocity, and the flow velocity U in the X direction is represented by a contour line. When the control flow is at the pilot side, the contour line of U=−10 m/s extends to the vicinity of the nozzle outlet, but when the control flow is at the main side, the contour line extends only close to X=20 mm. Further, the following difference in flow in the vicinity of nozzle outlets is observed between the two cases. Thus, contour line of U=0 m/s that extends from the nozzle outlet is directed outward at a larger angle in the case where the control flow is at the main side. In order to compare the flows in the vicinity of nozzle, the distribution of axial flow velocity U at X=7.2 mm is shown in FIG. 15A. Both in the case where the control flow is at the pilot side and in the case where the flow rate is at the main side, the inclination of flow velocity distribution changes abruptly close to Y=±23 mm, and the flow can be considered to be from the main nozzle on the outside of this position and from the pilot nozzle on the inside of this position. The flow field downstream of the pilot nozzle is a flow that comes directly from the nozzle and a flow produced by mixing with the flow that enters this area due to counterflow. Where the control flow is changed, the flow velocity distribution downstream of the pilot nozzle changes significantly. The flow velocity distribution shown in FIG. 14 and visual observations of flame shape during the combustion test indicate that the flow from the pilot nozzle flows along the conically expanding wall surface of the pilot nozzle. Thus, in the vicinity of Y=±20 mm in FIG. 15A, the flow is directly from the pilot nozzle, and the flow velocity in this portion is accelerated or delayed by setting the control flow to the pilot side or main side, respectively. The change in flow velocity represents the change in flow rate and indicates that the control of flow rate distribution has been performed by the fluidic element. Where the flow velocity of flow from the pilot nozzle is changed, the flow velocity of the flow that goes with this flow also changes and the flow velocity of the reverse flow close to the center also changes correspondingly.

The flow rate of the control flow necessary to switch the flow state was also studied. The fluidic element used in the present test has a hysteresis characteristic, and if the flow rate of the control flow is small, the flow state cannot be switched. The amount of control flow that is necessary for switching from the main side to the pilot side is shown in FIG. 15B. The ratio of flow rate Wcontrol of the control flow on the pilot side to the air amount Wa flowing into the combustor is plotted against the ordinate, and the cross-sectional average flow velocity Uc of the combustion chamber is plotted against the abscissa. The results in the figure are classified into the following categories: the flow state is promptly switched after the control flow has been switched from the main side to the pilot side, the switching was not prompt, but the switching was made within 10 sec, and no switching was made even after 10 sec. This figure demonstrates the flow can be switched when the ratio of the necessary flow rate of the control flow is almost constant and Wcontrol/Wa is equal to or higher than 3.1% that even if the air flow rate of the combustor varies. The results relating to switching from the pilot side to the main side are not shown in the graph, but in this case, the flow can be switched at a flow rate of 3% that is almost identical to that of switching to the pilot side.

The water flow test on a two-dimensional model, water flow test on a three-dimensional model, and combustion test under atmospheric pressure were carrier out to perform control of air flow rate distribution of the pilot nozzle and main nozzle disposed coaxially by using a fluidic element. The results obtained confirmed that the air flow rate distribution can be controlled by the fluidic element attached upstream of the fuel nozzle and that the combustion state can thus be changed.

The present invention can be applied to a jet engine combustor and a combustor of a gas turbine for power generation, and by controlling the flow rate distribution of air supplied to the combustor it is possible to maintain the flame formed inside the combustor in a good state over a wide load range, in particular, in a combustor using lean premixing combustion.

The present invention is not limited to the above-described combustors and can be also applied to a combustor that is equipped with a plurality of air inflow systems and has operation conditions varying in a wide range.

What is claimed is:

1. A combustor having a plurality of burners which are configured so that a central pilot burner is surrounded by an annular main burner, wherein
with a fluidic element being disposed upstream of a passage of air for combustion that is supplied to each burner, the fluidic element being of an annular configuration with a Y-shaped cross section, and means for sucking out or blowing out air into a control air passage of the fluidic element being provided, distribution of a flow rate of the air flowing into the pilot burner and the main burners is controlled by changing a flow direction of the air for combustion, and at the upper stream side of a swirler the air flow from the fluidic element is made to flow into the pilot burner and the main burner directly through the swirler without being mixed with other air flows.

2. The combustor equipped with an air flow rate distribution control mechanism according to claim 1, wherein said fluidic element is the flat shape obtained by cutting out the edge of a splitter.

3. The combustor equipped with an air flow rate distribution control mechanism according to claim 1, wherein the means for sucking out or blowing out air into the control air passage is switchably provided with a function of sucking air from one of two control pons and a function of blowing air into the other of the control ports.

4. The combustor equipped with an air flow rate distribution control mechanism according to claim 2, wherein the means for sucking out or blowing out air into the control air passage is switchably provided with a function of sucking air from one of two control ports and a function of blowing air into the other of the control ports.

5. The combustor equipped with an air flow rate distribution control mechanism according to claim 1, wherein the means for sucking out or blowing out air into the control air passage is provided only with a function of sucking air into a control port.

6. The combustor equipped with an air flow rate distribution control mechanism according to claim 2, wherein the means for sucking out or blowing out air into the control air passage is provided only with a function of sucking it into a control port.

7. The combustor equipped with an air flow rate distribution control mechanism according to claim 1, wherein a second passage, in which air supplied to the burners does not pass through the fluidic element, is provided in addition to the passage, in which the air passes through the fluidic element.

8. The combustor equipped with an air flow rate distribution control mechanism according to claim 2, wherein a second passage, in which air supplied to the burners does not pass through the fluidic element, is provided in addition to the passage, in which the air passes through the fluidic element.

9. A jet engine comprising:
a plurality of combustors having an air flow rate distribution control mechanism disposed annularly in positions inside a liner,
wherein each combustor has a plurality of burners including a main burner and a pilot burner, a fluidic element disposed upstream of a passage of air for combustion that is supplied to each burner, and means for sucking out or blowing out air into a control air passage of the fluidic element being provided, and
wherein distribution of a flow rate of the air flowing into the burners is controlled by changing a flow direction of the air for combustion.

10. The jet engine according to claim 9,
wherein the plurality of burners are configured so that a central pilot burner is surrounded by an annular main burner, and the fluidic element is of an annular configuration with a Y-shaped cross section.

* * * * *